United States Patent [19]
Zang et al.

[11] Patent Number: 5,876,124
[45] Date of Patent: Mar. 2, 1999

[54] HYDRODYNAMIC BEARING UNIT

[75] Inventors: Yan Zang, Milpitas; Michael R. Hatch, Mountain View, both of Calif.; Shinichi Minakuchi, Iyo, Japan

[73] Assignee: Quantum Corporation, Milpitas, Calif.

[21] Appl. No.: 638,025

[22] Filed: Apr. 26, 1996

Related U.S. Application Data

[63] Continuation-in-part of Ser. No. 519,842, Aug. 25, 1995, Pat. No. 5,634,724.

[51] Int. Cl.$^6$ ..................................................... F16C 33/74
[52] U.S. Cl. ........................... 384/107; 384/119; 384/124
[58] Field of Search .................................. 384/113, 107, 384/112, 124, 123, 119

[56] References Cited

U.S. PATENT DOCUMENTS

| | | | |
|---|---|---|---|
| 4,254,961 | 3/1981 | Fersht et al. | 277/80 |
| 4,795,275 | 1/1989 | Titcomb et al. | 384/107 |
| 5,067,528 | 11/1991 | Titcomb et al. | 141/4 |
| 5,112,412 | 5/1992 | Titcomb et al. | 384/107 |
| 5,161,900 | 11/1992 | Bougathou et al. | 384/119 |
| 5,246,294 | 9/1993 | Pan | 384/119 |
| 5,423,612 | 6/1995 | Zang et al. | 384/119 |
| 5,427,456 | 6/1995 | Hensel | 384/112 |
| 5,448,120 | 9/1995 | Schaule et al. | 310/90 |
| 5,516,212 | 5/1996 | Titcomb | 384/107 |
| 5,533,811 | 7/1996 | Polch et al. | 384/107 |
| 5,536,088 | 7/1996 | Cheever et al. | 384/107 |
| 5,558,443 | 9/1996 | Zang | 384/112 |
| 5,558,445 | 9/1996 | Chen et al. | 384/132 |

*Primary Examiner*—Lenard A. Footland
*Attorney, Agent, or Firm*—John C. Chen; David B. Harrison

[57] ABSTRACT

A self-contained hydrodynamic bearing unit with improved sealing and performance is disclosed. Centrifugal capillary seals are angularly defined between an outwardly tapered outer surface of a top screw and an inwardly tapered inner surface of an annular clamp ring at the top of the bearing unit as well as between an outwardly tapered outer surface of a seal plate and an inwardly tapered inner surface of an annular clamp ring at the bottom of the bearing unit. During operation, bearing lubricant is pumped away from the seal opening and toward the bearings by centrifugal force at the seals, providing dynamic sealing. When the bearing unit is not rotating, capillary forces retain the lubricant within the seal, preventing the lubricant from leaking. The tapered configuration of the seals also shortens the vertical seal length for a given effective seal length, thereby maximizing the journal bearing length/span and improving dynamic performance of the bearing unit.

18 Claims, 5 Drawing Sheets

HYDRODYNAMIC BEARING UNIT

REFERENCE TO RELATED APPLICATION

This application is a continuation-in-part of application Ser. No. 08/519,842 filed Aug. 25, 1995, now U.S. Pat. No. 5,634,724.

FIELD OF THE INVENTION

The present invention relates to fluid bearings. More particularly, the present invention relates to a hydrodynamic bearing unit for a spindle motor having reduced parts count and centrifugal capillary seals for preventing bearing lubricant leakage and reducing journal bearing length and/or span.

BACKGROUND OF THE INVENTION

The development of computer hard disk drives demands ever increasingly higher track density, lower acoustic noise, and better reliability under shock and vibrational disturbances. The undesirable characteristics of the widely used ball bearing spindles, such as high non-repetitive runout, large acoustic noise, and high resonance frequencies due to bearing defect, impose severe limitation on the drive's capacity and performance.

The use of a non-contact bearing, such as a hydrodynamic bearing ("HDB"), may overcome the aforementioned limitation. The full film lubrication of a fluid bearing displays significantly lower non-repetitive runout and acoustic noise, and its higher damping provides better resistance to external shock and vibration.

The deployment of the HDB system in a hard disk drive environment requires that the lubricant be securely sealed inside of the bearing structure under all operating and non-operating conditions in order to prevent performance degradation of the bearing and contamination in the drive. At the same time, the bearing system needs to have enhanced dynamic performance and be easily manufacturable in order to satisfy cost requirements. As explained below these requirements often come into conflict with each other and have heretofore resulted in compromised HDB spindle designs.

There have been a number of prior approaches for providing seals for hydrodynamic bearing units. Static seals, such as O-rings and surface tension or capillary seals, have been employed to seal hydrodynamic bearings.

An example of capillary seals is disclosed in commonly-assigned U.S. Pat. No. 5,423,612 entitled: "Hydrodynamic Bearing and Seal", the disclosure thereof being incorporated herein by reference. One drawback of the approach described in the '612 patent is it has proven somewhat difficult to provide recirculation ports around the bearings in order to realize a lubricant recirculation capability in circumstances such as imbalanced pumping and/or shock load. Another drawback is that since both top and bottom seals are at the inside diameter of the HDB unit, any splashed droplets which separated from the lubricant surface may be driven out of the bearing by centrifugal force. In addition, because of the small seal volume available at the HDB unit inside diameter, the lubricant may leak out of the bearing due to thermal expansion and/or filling volume variations. Finally, another drawback is that the capillary seals are defined such that a larger taper angle was not manufacturably possible. That is, to increase the taper angle of the seals, shaft diameter at the ends would have to be decreased or the overall diameter would have to be increased to the point of degrading bearing performance.

Small (3.5 inch disk diameter and smaller) form factor disk drives are used in unlimited applications and orientations. Consequently, a hydrodynamic bearing system for a disk spindle in such drives, e.g. having a full Z-dimension of 1.6 inch height spindle manifesting high inertial loading, must also operate in all possible orientations, and to be able to withstand and sustain certain shock events and vibration levels without leakage. A cover-secured or top-fixed HDB motor is required for disk drives with high inertial load, such as disk drives including six or more rotating disks. For top-fixed spindles, the requirement for two lubricant seals poses a considerable challenge.

Figure 1:
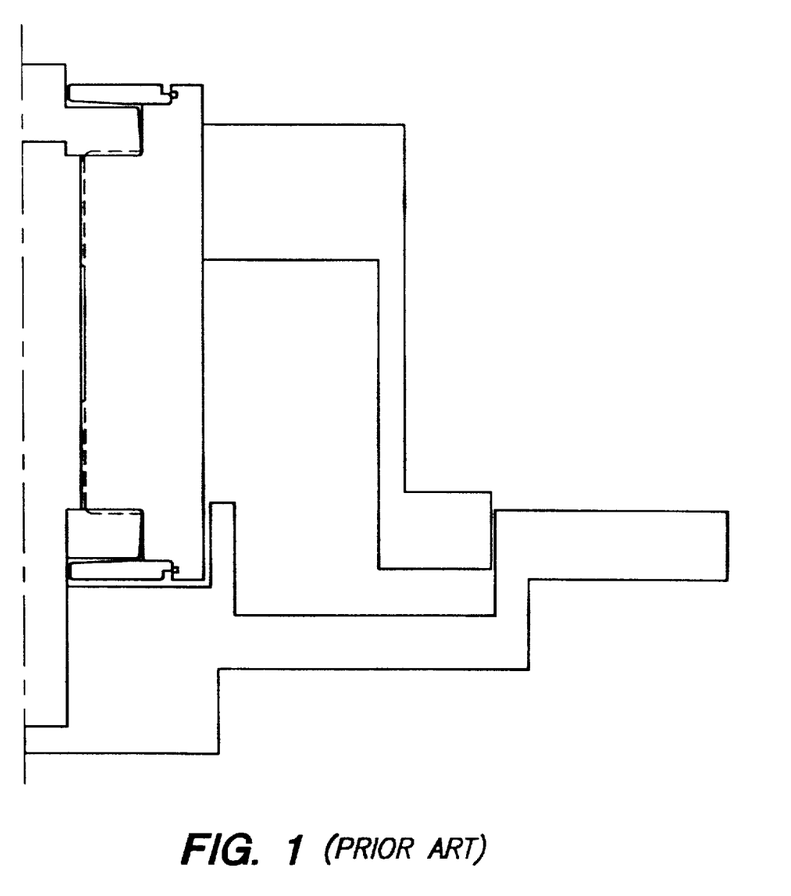
FIG. 1 is an enlarged view in elevation and section of a right half side of a double thrust plate HDB spindle unit

Generally, there are two types of top-fixed HDB spindle designs, namely, a single thrust-plate design, and a double thrust-plate design, shown in FIG. 1.

The single thrust plate design described is U.S. Pat. No. 5,423,612 exhibits the drawbacks discussed above.

The double thrust plate design of FIG. 1 was an improvement over the single thrust plate design in some aspects. However, the double thrust-plate design illustrated in FIG. 1 also exhibited the drawback of controlling the tolerance of the total length of the sleeve which defines the thrust bearing clearance (which is about 10 microns). Another drawback related to manufacturing difficulty in controlling the tolerances of perpendicularity and surface finish at both ends of the e.g. bronze sleeve. In addition, because the sleeve is typically made of bronze, the sleeve tends to wear by coming into contact with the grooved steel thrust plate having pumping grooves during starting and stopping intervals.

Figure 2:
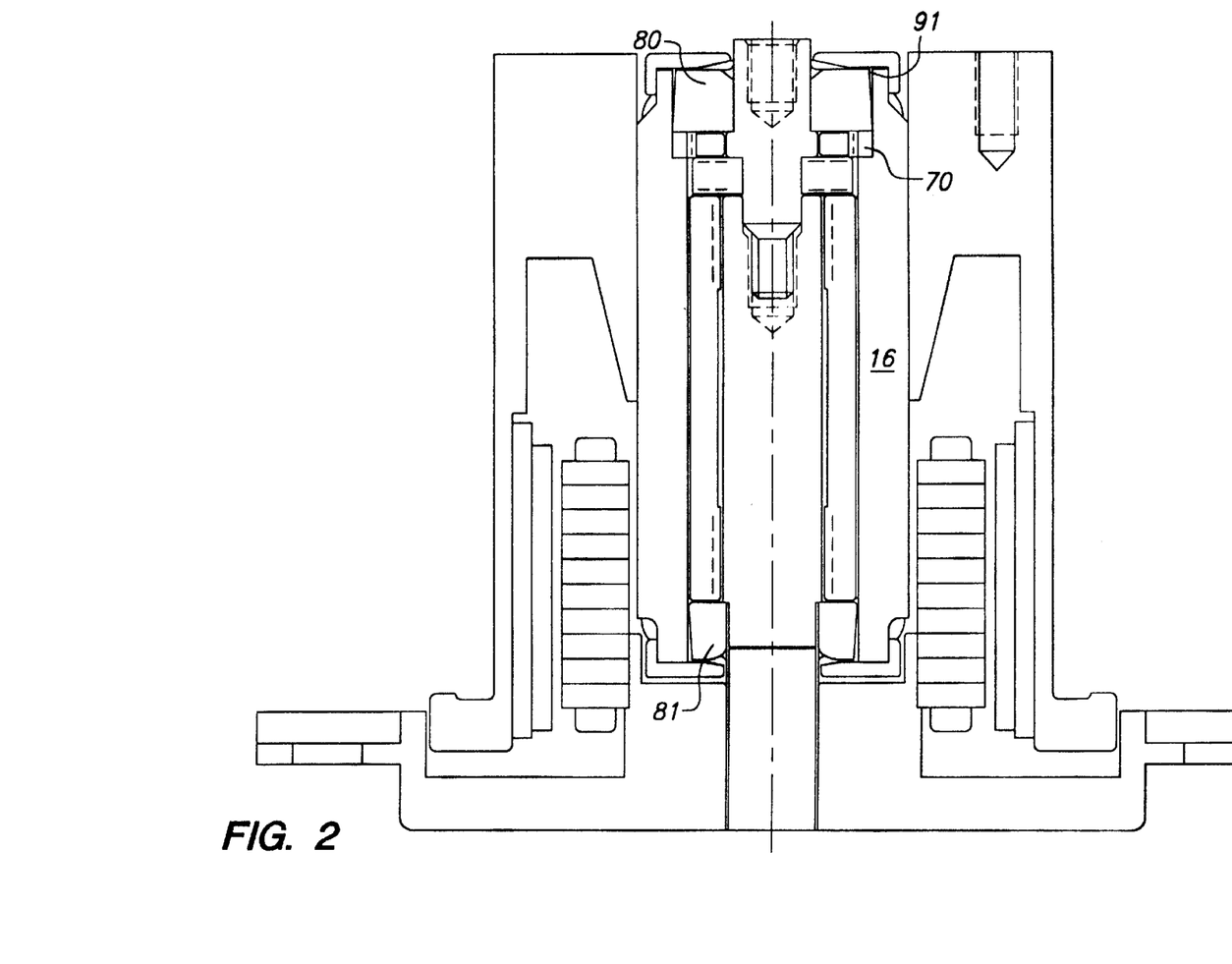
FIG. 2 is an enlarged view in elevation of a single thrust plate, double seal plate HDB spindle unit.

An HDB improving upon both the single thrust plate design of the '612 patent and the double thrust plate design of FIG. 1 was proposed in commonly assigned U.S. patent application Ser. No. 08/519,842, shown in FIG. 2, the disclosure thereof being incorporated herein by reference. However, the single thrust plate HDB of FIG. 2 still manifests certain drawbacks. Specifically, the thrust bearing clearance may vary due to possible deformation caused by press fitting thrust bushing 70 onto outer sleeve 16 over a short shoulder on sleeve 16 whose length is limited by the location of the top seal. In addition, the diameter of the top seal plate 80 is larger than that of the bottom seal plate 81, which may cause unidirectional pumping by centrifugal force. Another drawback is that the orientation of the capillary seals 91 does not utilize centrifugal force in sealing the lubricant. Bearing lubricant is pulled back only by static forces, i.e. capillary forces. Finally, the capillary seals are oriented such that a requirement for long capillary seal length would reduce the journal bearing length and/or journal bearing span in such a way that dynamic performance is degraded in small form factor spindles e.g. a 1 inch height disk drive.

Thus, a hitherto unsolved need has remained for a hydrodynamic bearing system which is leak free irrespective of orientation, shock and vibration, and which is readily and reliably manufacturable at reasonably low manufacturing cost.

SUMMARY OF THE INVENTION WITH OBJECTS

A general object of the present invention is to provide an improved self-contained hydrodynamic bearing for a spindle which overcomes limitations and drawbacks of the prior art.

More specifically, it is an object of the present invention to provide an improved hydrodynamic bearing system which minimizes uni-directional pumping.

Yet another object of the present invention is to provide a simplified hydrodynamic bearing design which is simpler to manufacture, which operates reliably in any angular orientation, and which achieves superior bearing longevity over prior art fluid bearing designs.

The aforementioned objects are achieved in a self-contained hydrodynamic bearing unit including a single thrust plate, two seal plates, a thrust bushing, and two dynamic centrifugal capillary seals. The seal plates, each located at opposite ends of the shaft, are defined at the same outer diameter, which eliminates any uni-directional pumping effects from centrifugal force. An upper capillary seal is defined at an angle downwardly tapered towards the outer diameter, utilizing centrifugal force to prevent lubricant leakage. A lower capillary seal is located at the opposite end of the shaft and is defined at an angle upwardly tapered towards the outer diameter, utilizing centrifugal force to prevent leakage at the bottom of the bearing. The tapered orientation of the seals maximizes the effective seal length as well as the journal bearing length/span while minimizing the vertical seal length. In addition, a containment ring is adhesively mounted at the top and bottom of the bearing unit to further prevent lubricant droplets leaking from the seals from contaminating disk surface.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figure 3:
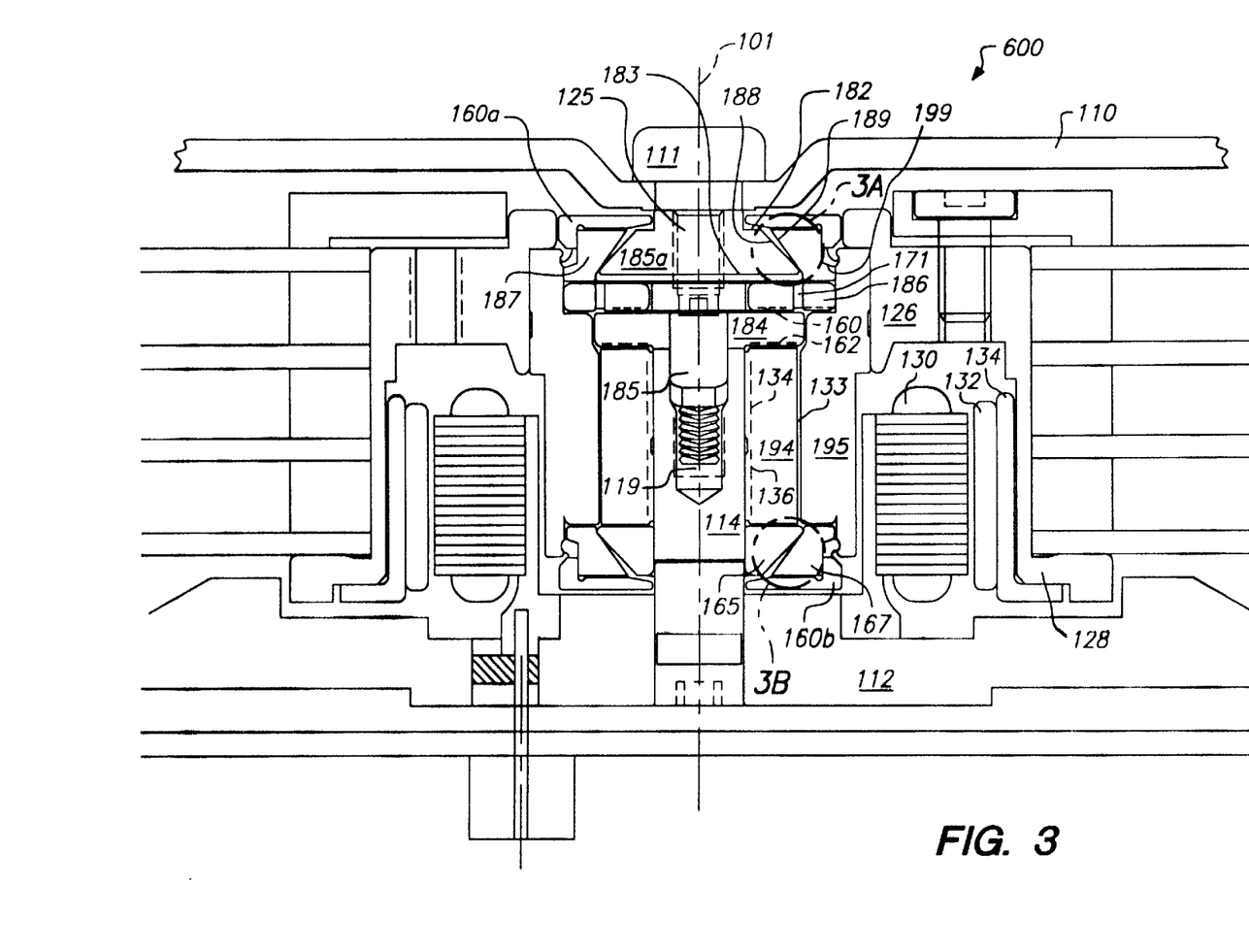
FIG. 3 is an enlarged diagrammatic view in section and elevation of a single thrust plate, double seal plate, HDB spindle unit in accordance with principles of the present invention.

Turning to FIG. 3, a single thrust plate, double seal, HDB spindle unit 600 incorporating principles of the present invention includes a central shaft 114 for press fitting into a base 112 and extending upwardly in the orientation shown in FIG. 3. A rotating bronze inner sleeve 194 and an outer sleeve 195 fits concentrically over the shaft with sufficient clearance between the shaft 114 and the inner sleeve 194 to permit free relative rotation about a longitudinal axis of rotation 101. A stainless steel annular thrust plate 184 is seated on an annular shaft shoulder portion of the shaft 114. The thrust plate 184 includes two parallel radial faces which are perpendicular to the longitudinal axis 101. An annular thrust bushing 186 is seated on a shoulder portion the outer sleeve 195. At the other end of the shaft 114, an annular bottom seal plate 165 is press fit over the bottom portion of shaft 114, creating a clearance with the lower radial wall of the sleeve 194. An annular bottom clamp ring 167 fits concentrically over bottom seal plate 165 and is secured to the outer sleeve 195 of the sleeve with a suitable adhesive 199. A lower containment ring 160b is secured to the bottom clamp ring 167 with a suitable adhesive 199 to complete the bottom portion of the HDB unit 600. A suitable hydrodynamic lubricant may then be introduced into the bearing unit by conventional techniques such as vacuum filling.

The shaft 114 defines a threaded axial opening 119 at the top for receiving a threaded shaft bolt 185 which includes a threaded boss 125 for receiving a screw 111 for securing the shaft 114 to a top cover 110 to provide structural rigidity to the spindle unit 600.

The insertion and tightening of threaded shaft bolt 185 further secures the thrust plate 184 and the thrust bushing 186. An annular top clamp ring 187 is press fit against and adhesively secured (with adhesive 199) to an upper shoulder portion of outer sleeve 195 and is concentric about the shaft bolt 185 . The top clamp ring 187 provides support to the thrust bushing 186, securing the thrust bushing against the outer sleeve 195. The top clamp ring 187 therein enables the thrust bushing 186 to be inserted without press fitting against the outer sleeve, as required in prior HDB units, thereby eliminating the possibility of deformation to the bushing. An upper containment ring 160a is then secured to the top clamp ring 187 with the suitable adhesive 199 to complete the HDB unit 600.

A hollow cylindrical hub 126 is fitted over the outer sleeve 195 and supports one or more rotating data storage disks in a stacked arrangement extending upwardly from an integral lower flange 128. A spindle motor includes a fixed stator assembly 130 and a rotating annular magnet 132 closely facing outer pole faces of the stator assembly 130. An annular ferromagnetic ring 134 provides a flux return path to the alternating polar faces of the annular permanent magnet 132, and provides a magnetic shield to inhibit stray magnetic flux from the magnet 132 from reaching the data storage disks.

The inner sleeve 194 includes at least one hydrodynamic journal bearing, and FIG. 3 shows two journal bearings 134 and 136 defined on an inner surface of the inner sleeve 194. The journal bearings may be patterned by suitable machining techniques to define pumping grooves forming herringbone or other pumping patterns which are operative to pump hydrodynamic lubricant incident to rotation of the sleeves about the shaft 114. Two longitudinal bores may be defined between the inner sleeve 194 and the outer sleeve 195 to provide two recirculation ports 133. The recirculation ports provide passage ways for the lubricant to circulate through journal bearings 134 and 136, bottom thrust bearing 162 and the clearance between the inner sleeve 194 and the bottom seal plate 165 in the event of a shock load. The ports may be drilled or made by wire electrical discharge machining (EDM) if the inner sleeve 194 and the outer sleeve 195 consist of a one piece design. Alternatively, in a two piece embodiment, the ports 133 may be machined on the outer diameter of the inner sleeve 194 before being press fitted with the outer sleeve 195.

The thrust plate 184 includes a bottom thrust bearings 162, defined between the upper radial face of inner sleeve 194 and the bottom radial face of the thrust plate 184 such that sufficient clearance exists to permit free relative rotation between mating surfaces. The thrust bushing 186 is secured over the thrust plate 184 with sufficient clearance to permit free relative rotation between mating surfaces forming an upper thrust bearing 160. The bearing surface clearances are selected to minimize axial runout while permitting free relative rotation. The bearings are patterned by suitable machining techniques, such as etching or stamping, to define a pumping pattern, such as a herringbone pattern. Holes 171 may be machined on the thrust bushing 186 to provide recirculation ports around the upper thrust bearing 160 and the clearance between the surface 183 of the shaft bolt 185a and the upper surface of thrust bushing 186.

Figure 3A:
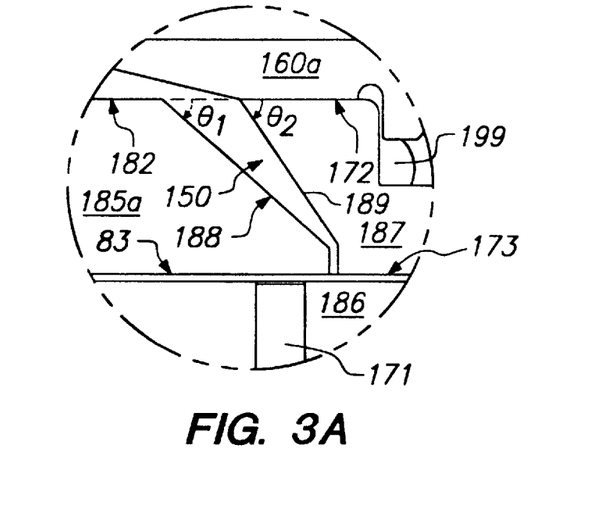
FIG. 3A is an enlarged view of the upper centrifugal capillary seal highlighted in FIG. 3, showing the angle at which the seal is tapered.

The shaft bolt 185 includes an integrally formed top seal plate 185a which is seated against thrust bushing 186 when the shaft bolt is tightened into the shaft opening 119. The integration of the shaft bolt 185 and top seal plate 185a reduces the overall parts count and simplifies the manufacturing and assembly process. As shown in FIG. 3 the top seal plate 185a includes an outer surface 188 angularly defined between two parallel radial faces 183 and 182. Lower radial face 183 has a larger diameter than upper radial face 182 such that outer surface 188 is angled outwardly from radial face 182 to radial face 183 (as shown in FIG. 3A). In one preferred embodiment, outer surface 188 is angled at approximately $\theta_1 = 45$ degrees from radial face 182.

Top clamp ring 187 includes an inner surface 189 angularly defined between parallel radial faces 172 and 173 (shown in FIG. 3A). Lower radial face 173 is radially offset from upper radial face 172 such that inner surface 189 is angled outwardly from upper radial face 172 to lower radial face 173. In one preferred embodiment, inner surface 189 is angled at approximately $\theta_2 = 50$ degrees from upper radial face 172.

Figure 3B:
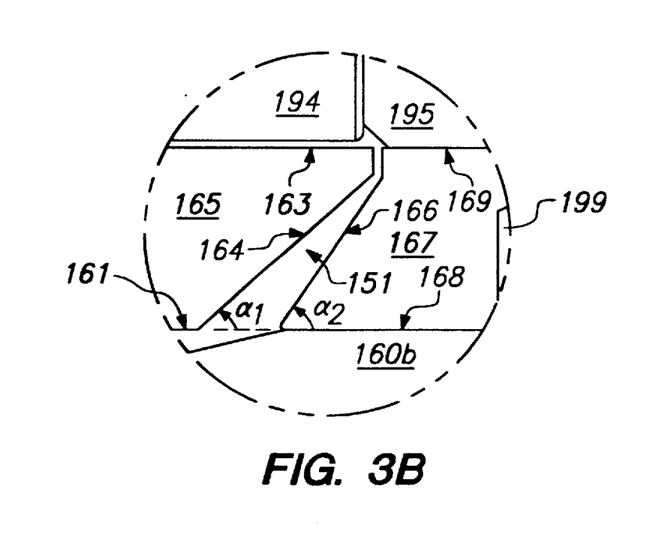
FIG. 3B is an enlarged view of the lower centrifugal capillary seal highlighted in FIG. 3, showing the angle at which the seal is tapered.

Bottom seal plate 165 includes an outer surface 164 angularly defined between two parallel radial faces 163 and 161. Upper radial face 163 has a larger diameter than lower radial face 161 such that outer surface 164 is angled outwardly from lower radial face 161 to upper radial face 163 (as shown in FIG. 3B). In one preferred embodiment, outer surface 164 is angled at approximately $\alpha_1 = 45$ degrees from radial face 161.

Bottom clamp ring 167 includes an inner surface 166 angularly defined between parallel radial faces 168 and 169 (shown in FIG. 3B). Upper radial face 169 is radially offset from lower radial face 168 such that inner surface 166 is angled outwardly from lower radial face 168 to upper radial face 169. In one preferred embodiment, inner surface 166 is angled at approximately $\alpha_2 = 50$ degrees from lower radial face 168.

FIGS. 3A and 3B presents a detailed and magnified view of the centrifugal capillary seals of HDB unit 600, which are yet, another distinguishing feature of the present invention. Upper centrifugal capillary seal 150, as shown in FIG. 3A, is defined between outer surface 188 of top seal 185a and inner surface 189 of top clamp ring 187. The upper containment ring 160a includes an integrally formed downturned flange and is secured to the top clamp ring 187 with a suitable adhesive 199. Centrifugal force generated by the rotation of upper containment ring 160a pumps any droplets escaping from the upper centrifugal capillary seal 150 toward the outer diameter of the HDB 600, and back into centrifugal seal 150, thereby preventing droplets from contaminating disk surfaces. Lower centrifugal capillary seal 151, shown in FIG. 3B, is defined between outer surface 164 of bottom seal plate 165 and inner surface 166 of bottom clamp ring 167. The lower containment ring 160b includes an integrally formed upturned flange and is secured to the bottom clamp ring 167 using a suitable adhesive 199, preventing droplets of lubricant, leaking from the lower capillary seal 151, from contaminating disk surfaces in a manner similar to that of the upper containment ring 160a. The angled orientation of seals 150 and 151 exerts centrifugal forces on the lubricant when the sleeves are rotating during spindle operation, pumping the lubricant to the outer diameter and back towards the bearing system and reducing the likelihood of leakage. Once the spindle motor stops and the sleeve stops rotating, capillary forces retain the lubricant within the seal, preventing the lubricant from leaking out of the bearing system.

The large relative taper angle of the capillary seals presented in this preferred embodiment exploits centrifugal force as a sealing mechanism to a magnitude that was previously not feasible. In addition, the angled orientation of the upper and lower centrifugal capillary seals maximizes the effective seal length as well as the journal bearing length/span while minimizing the vertical seal length. The result is that overall spindle motor height may be minimized while the sealing performance of the bearing unit is improved.

The improved structure of the present invention also enables the top seal plate 185a to have the same outer diameter as the bottom seal plate 165, thus eliminating any unidirectional pumping effects from centrifugal force.

Figure 4:
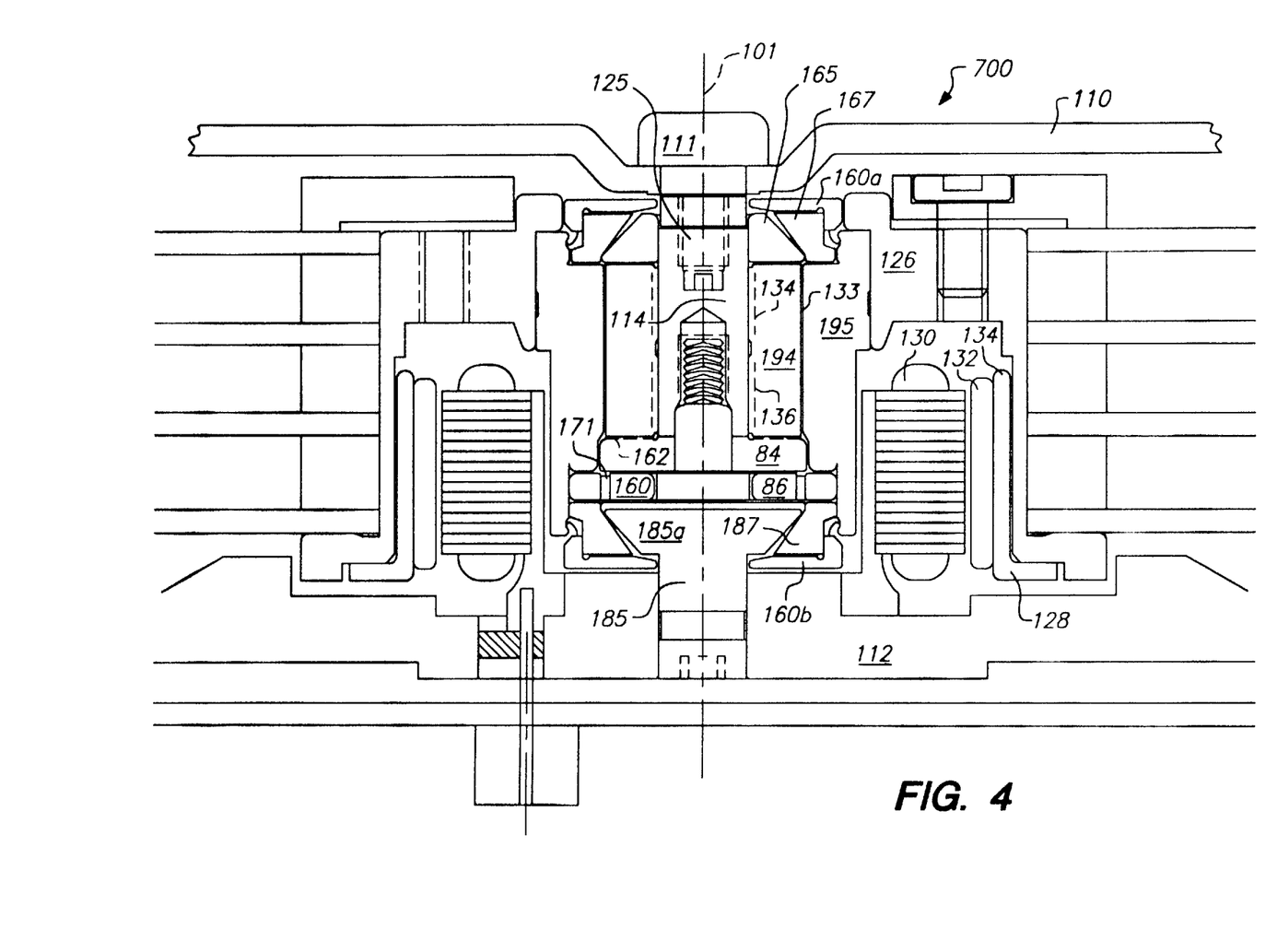
FIG. 4 is an enlarged view in elevation and section of a right half side of an alternative HDB of the HDB spindle unit of FIG. 3.

FIG. 4 presents another HDB unit 700 which modifies the FIG. 3 embodiment 600 by inserting the top screw 185 into the base 112 such that the HDB unit 700 is inverted in a top side down orientation. Otherwise, the description given above for the FIG. 3 embodiment applies to the embodiment 700 of FIG. 4.

As used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures and should not be construed as limiting.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A self-contained hydrodynamic bearing unit comprising:

a shaft defining a threaded axial opening at one end thereof and a shaft shoulder adjacent the opening and perpendicular with a longitudinal axis of the shaft;

a cylindrical inner sleeve defining an opening for receiving the shaft for relative rotation about the longitudinal axis;

a cylindrical outer sleeve integrally concentric about the inner sleeve;

a pair of longitudinally spaced-apart radial hydrodynamic journal bearings defined between the shaft and the inner sleeve;

a top screw including a threaded end region for mating with the threaded axial opening of the shaft, the top screw further including a top seal plate integrally formed therein having a circumferential outer surface;

an annular thrust plate having two parallel radial faces being adapted to fit upon the shaft shoulder;

a first radial thrust bearing surface defined between one of the radial faces of the thrust plate and a first end of the inner sleeve;

an annular thrust bushing having two parallel radial faces, a first face being seated on the outer sleeve;

an annular top clamp ring securely fitted within the outer sleeve, the top clamp ring having a circumferential inner surface;

a second radial thrust bearing surface defined between the first radial face of the thrust bushing and the other parallel radial face of the thrust plate;

a first annular capillary seal angularly defined between the inner surface of the clamp ring and the outer surface of the top seal plate such that centrifugal force pumps lubricant toward the thrust bearing;

an annular upper containment ring adhesively mounted to the annular top clamp ring; and an annular bottom seal plate mounted concentrically about the shaft at an end opposite the axial threaded opening, the bottom seal plate having an outer surface;

an annular bottom clamp ring mounted to the outer sleeve, the bottom clamp ring having an inner surface; and a second annular capillary seal angularly defined between the inner surface of the bottom clamp ring and the outer surface of the bottom seal plate so that centrifugal force pumps the lubricant toward the journal bearings.

2. The self-contained hydrodynamic bearing unit set forth in claim 1 wherein the outer surface of the top portion of the top screw is defined between two parallel radial faces, the first radial face having a first diameter greater than a second diameter of the second radial face.

3. The self-contained hydrodynamic bearing unit set forth in claim 2 wherein the outer surface is angularly defined at approximately 45 degrees between the two parallel radial faces.

4. The self-contained hydrodynamic bearing unit set forth in claim 1 wherein the inner surface of the annular top clamp ring is defined between two parallel radial faces, the first radial face being located at a radial position farther away from the longitudinal axis than the second face.

5. The self-contained hydrodynamic bearing unit set forth in claim 4 wherein the inner surface is tapered at approximately 50 degrees between the two parallel radial faces.

6. The self-contained hydrodynamic bearing unit set forth in claim 1 wherein the outer surface of the bottom seal plate is defined between two parallel radial faces, the first radial face having a first diameter smaller than a second diameter of the second radial face.

7. The self-contained hydrodynamic bearing unit set forth in claim 6 wherein the outer surface of the bottom seal plate is tapered at approximately 45 degrees between the two radial surface.

8. The self-contained hydrodynamic bearing unit set forth in claim 1 wherein the inner surface of the annular bottom clamp ring is defined between two parallel radial faces, the first radial face being located at a radial position closer to the longitudinal axis than the second face.

9. The self-contained hydrodynamic bearing unit set forth in claim 8 wherein the inner surface of the annular containment ring is angularly defined at approximately 50 degrees between the two radial surface.

10. A self-contained hydrodynamic bearing unit comprising:

a base;

a shaft fixed at one end to the base, and providing a cover attachment means at another end for securing a cover fixed relative to the base, the shaft defining a threaded axial opening at one end thereof and a shaft shoulder adjacent the opening and perpendicular with a longitudinal axis of the shaft;

a cylindrical inner sleeve defining an opening for receiving the shaft for relative rotation about the longitudinal axis;

a cylindrical outer sleeve integrally concentric about the inner sleeve;

a pair of longitudinally spaced-apart radial hydrodynamic journal bearings defined between the shaft and the inner sleeve;

a top screw including a threaded end region for mating with the threaded axial opening of the shaft, the top screw further including a top seal plate integrally formed therein having a circumferential outer surface;

an annular thrust plate having two parallel radial faces being adapted to fit upon the shaft shoulder;

a first radial thrust bearing surface defined between one of the radial faces of the thrust plate and a first end of the inner sleeve;

an annular thrust bushing having two parallel radial faces, a first face being seated on the outer sleeve;

an annular top clamp ring securely fitted within the outer sleeve, the top clamp ring having an inner surface;

a second radial thrust bearing surface defined between the first radial face of the thrust bushing and the other parallel radial face of the thrust plate;

a first annular capillary seal angularly defined between the inner surface of the clamp ring and the outer surface of the top seal plate such that centrifugal force pumps lubricant toward the thrust bearing;

an annular upper containment ring adhesively mounted to the annular top clamp ring; and an annular bottom seal plate mounted concentrically about the shaft at an end opposite the axial threaded opening, the bottom seal plate having an outer surface;

an annular bottom clamp ring mounted to the outer sleeve, the bottom clamp ring having an inner surface; and a second annular capillary seal angularly defined between the inner surface of the bottom clamp ring and the outer surface of the bottom seal plate so that centrifugal force pumps the lubricant toward the journal bearings.

11. The self-contained hydrodynamic bearing unit of claim 10 wherein the circumferential outer surface of the top portion of the top screw is defined between two parallel radial faces.

12. The self-contained hydrodynamic bearing unit of claim 11 wherein the circumferential outer surface is angularly defined at approximately 45 degrees between the parallel radial faces.

13. The self-contained hydrodynamic bearing unit set forth in claim 10 wherein the inner surface of the annular top clamp ring is defined between two parallel radial faces, the first radial face being located at a radial position farther away from the longitudinal axis than the second face.

14. The self-contained hydrodynamic bearing unit set forth in claim 13 wherein the inner surface is tapered at approximately 50 degrees between the two parallel radial faces.

15. The self-contained hydrodynamic bearing unit set forth in claim 10 wherein the outer surface of the bottom seal plate is defined between two parallel radial faces, the first radial face having a first diameter smaller than a second diameter of the second radial face.

16. The self-contained hydrodynamic bearing unit set forth in claim 15 wherein the outer surface of the bottom seal plate is tapered at approximately 45 degrees between the two radial surfaces.

17. The self-contained hydrodynamic bearing unit set forth in claim 10 wherein the inner surface of the annular bottom clamp ring is defined between two parallel radial faces, the first radial face being located at a radial position closer to the longitudinal axis than the second face.

18. The self-contained hydrodynamic bearing unit set forth in claim 17 wherein the inner surface of the annular containment ring is angularly defined at approximately 50 degrees between the two radial surface.

* * * * *